Jan. 23, 1951 R. D. SMEALLIE 2,538,921
BEARING
Filed June 25, 1946 2 Sheets-Sheet 1
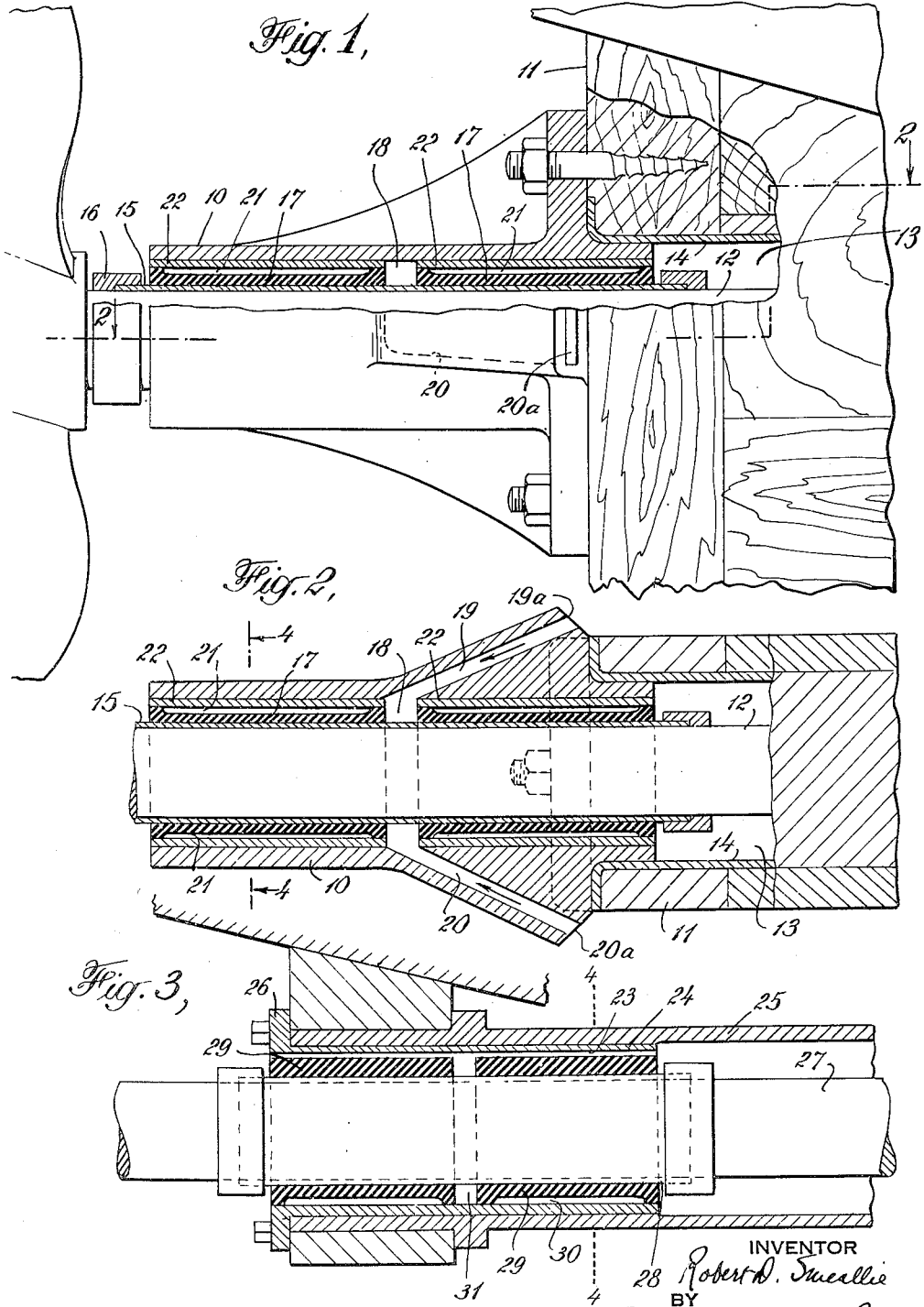
INVENTOR
Robert D. Smeallie
BY
Pennie Edmonds Morton Barrows
ATTORNEYS

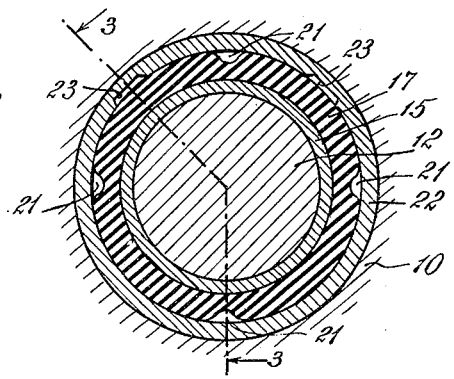
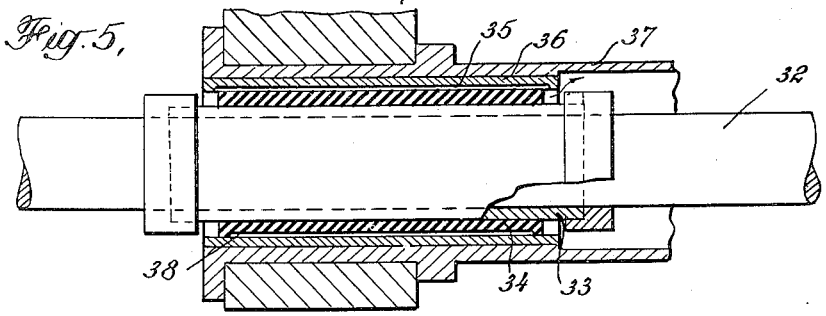
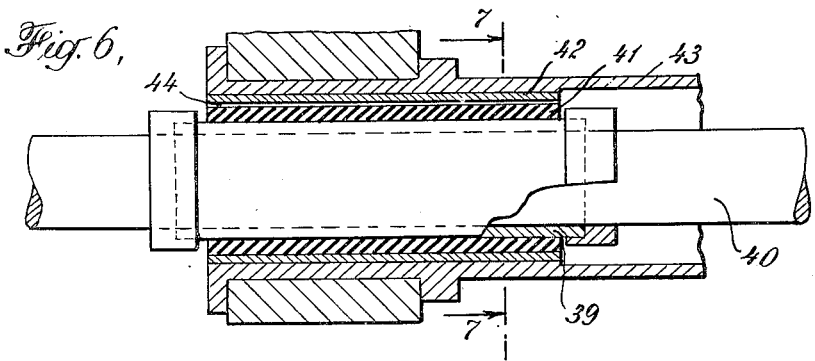
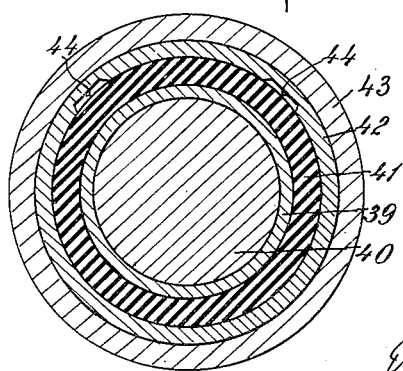

Patented Jan. 23, 1951

2,538,921

UNITED STATES PATENT OFFICE 2,538,921

BEARING

Robert D. Smeallie, Teaneck, N. J., assignor to The E. J. Willis Company, New York, N. Y., a corporation of New York Application June 25, 1946, Serial No. 679,157

14 Claims. (Cl. 308—240)

This invention relates to bearings of the type which operate within a body of lubricating fluid, examples of such bearings being those used as outboard bearings for the propeller shafts of vessels of various types. More particularly, the invention is concerned with a novel bearing for operation within a body of lubricant, which is superior to prior similar bearings in that, because of more effective use of the lubricating medium, the assembly is less subject to wear. When the new bearing is used for marine purposes on vessels operating in shoal water, under conditions in which sand or other gritty material enters the bearing, such abrasive material is quickly washed out and thus does not have an opportunity to cut or score the working surfaces of the bearing. The new bearing is similar in some respects to that disclosed in my co-pending application Serial No. 596,666, filed May 30, 1945, now Patent 2,405,799, issued August 13, 1946, but is more effective in operation and less expensive to construct.

The bearing of the invention may be used for both industrial and marine purposes, but, since its use is especially advantageous in boats, such as landing craft, a form of the bearing suitable for such marine use will be illustrated and described in detail for purposes of explanation. It will be evident, however, that the utility of the new bearing is not limited to marine use.

Water lubricated bearings for the propeller shafts of boats have been used for many years and, as made heretofore, have commonly included a stationary metal bushing having a lining of soft rubber within which the shaft rotates. The inner surface of the lining is provided with longitudinal grooves or channels which extend from end to end of the bushing, are open at their ends, and lie at a relatively close spacing throughout the entire circumference of the lining. It is expected that, when such a bearing is submerged, the water will flow through the channels and a film of water will be maintained between the surfaces of the rubber lining and the shaft, which are in contact, and act as a lubricant for those surfaces. It is also expected that, if particles of abrasive material enter such a bearing, any particles that are drawn between contacting portions of the lining and shaft will roll over the surface of the lining into the next channel and will be carried away by the water therein. Practical experience with the bearing described in water containing abrasive material has shown, however, that the metal working surface of the bearing becomes badly scored from abrasive particles and, also, at low speed operation, the film of water between the working surfaces is broken and the bearing operates substantially without lubricating action.

The bearing of the invention is so constructed that water is continually drawn into the bearing and discharged therefrom, so that any abrasive material carried by the water is quickly washed away and scoring of the working surfaces thereby is prevented. Also, in the preferred form of the new bearing, quantities of water are trapped within recesses in the working surface of the rotary member and are available at all times to maintain the lubricant film, regardless of the speed at which that member rotates.

For a better understanding of the invention, reference may be made to the accompanying drawings in which:

Fig. 1 is a view in side elevation and partly in section of a bearing of the invention mounted in a stern casting on a vessel;

Fig. 2 is a sectional view on the line 2—2 of Fig. 1;

Fig. 3 is a vertical sectional view of the new bearing mounted within a stern tube;

Fig. 4 is a sectional view on the line 4—4 of Fig. 3;

Figs. 5 and 6 are views similar to Fig. 3, but showing modified constructions; and Fig. 7 is a sectional view on the line 7—7 of Fig. 6.

The new bearing is illustrated in Fig. 1 in the form suitable for marine use and the bearing is mounted within a stern casting 10 secured to the stern post 11 of a vessel. The propeller shaft 12 of the vessel extends through a passage 13 into which the stern casting projects and the passage may have a lead lining 14. Packing (not shown) is employed to close the passage inward from the casting and thus prevents water from entering the vessel through the passage.

The shaft carries a metallic sleeve 15, which is secured in place on the shaft by suitable clamping rings 16 and is preferably somewhat longer than the casting 10 and projects beyond the latter at both ends. The sleeve 15 carries two sleeves 17 of rubber affixed thereto and having their remote ends lying substantially flush with the ends of the casting 10. The adjacent ends of the sleeves are separated to form a circumferential passage 18 about midway the length of the casting, and the casting is provided with a pair of passages 19, 20 which lead forward from the passage 18 and have open forward ends 19a, 20a. When the assembly is submerged, water may flow through the passages 19, 20 to the circumferential passage 18.

Each of the rubber sleeves 17 is formed with a plurality of recesses 21 in its outer surface and the recesses terminate inward from the ends of the sleeve. In the construction illustrated, each recess has the form of a channel extending axially of the sleeve, and each sleeve has four such channels at equal spacings. The recesses may have forms other than channels but the channels are preferred, because they are thoroughly effective and are easily formed in the rubber.

A pair of metallic bushings 22 are mounted against rotation within the casting 10, to enclose the respective sleeves 17, and the bushings are of the same length as the sleeves and have their ends aligned with those of the sleeves. The bushings 22 have longitudinal channels 23 in their inner surfaces, which extend from end to end thereof, and the channels are open at both ends and lie above a horizontal plane through the axis of the shaft. Preferably, two such channels are provided in each bushing 22 with the channels lying on either side of a vertical plane through the shaft and offset about 45° from that plane. The channels 23 in the rear bushing 22 are open at their rear ends for the entry of water and are in communication at their forward ends with the circumferential passage 18. The channels 23 in the forward bushing 22 are open at their rear ends to passage 18 and, at their forward ends, to the space within passage 13 forward of the bearing.

Although the rubber sleeves 17 of the bearing are shown in Fig. 4 as fitting snugly within bushings 22 throughout their circumferences, actually the weight of the rotary parts of the structure causes slight deformation of each sleeve in the lower half thereof and a crescent shaped clearance space develops between the sleeve and the bushing above a horizontal plane through the shaft. In tests that I have carried out, I find that, when the shaft is rotating clockwise, for example, a substantial vacuum develops in the clearance space near its left hand edge, and the vacuum is at approximately a maximum at a point on the left side of a vertical plane through the assembly and about 45° therefrom, that is, where one of the channels 23 through the bushing 22 is located. With the shaft rotating as described, a pressure condition is found to exist at a point to the right of the vertical plane through the assembly about 45° from that plane and that pressure condition prevails to the right hand edge of the clearance space.

The result of the conditions of vacuum and pressure mentioned is that, in the operation of the bearing, water is drawn into the clearance space near one edge thereof through the ends of the space and through one of the passages 23 in the bushing 22 and forced out of the clearance space near the other edge thereof through the ends of the space and the other passage 23. Water lying within each recess 21 is trapped in that recess as the latter passes beyond the right hand edge of the clearance space, and the water in the recess thus serves to bathe the areas of the working surfaces of the bearing through which load is transmitted from one member to the other. The weight of the rotary portion of the structure which produces the deformation of the rubber sleeves to form the clearance space tends to force the water out of the recesses and, as a result, the action is that of force-feed lubrication throughout the areas of the working surfaces through which the load is transmitted and where lubrication is of the greatest importance. The vacuum and pressure conditions, which cause water to be drawn in and forced out of the clearance space continually during the operation of the bearing, effect continual flushing of the bearing, so that any abrasive material, which may enter the assembly, is quickly removed therefrom.

The bearing illustrated in Fig. 1 is for heavy duty purposes, and the total length of the sleeves and bushings is such that it is desirable to employ two sleeves and bushings separated to provide the circumferential space 18 and to connect this space through the passages 19, 20 with the body of water, in which the assembly is submerged. When the vessel includes a stern tube to which water is supplied under pressure from within the vessel, the construction shown in Fig. 3 may be used. In this arrangement, a bushing 24 is mounted within the rear end of the stern tube 25, the bushing being provided at its rear end with a flange 26 which overlies the end of the stern tube. The shaft 27 carries a metallic sleeve 28 clamped thereon, on which a pair of rubber sleeves 29 are rigidly mounted. The sleeves have recesses 30 in their outer surfaces, the recesses taking the form of longitudinal channels terminating inward from the ends of the sleeves. The sleeves are spaced apart to form the circumferential passage 31 and the bushing 24 is provided with longitudinal channels in its inner surface similar in shape and location to the channels 23, Fig. 4. With this construction, water is supplied from the stern tube for one end of the bearing and the other end lies beneath the surface of the water on which the vessel floats. The water is drawn into the clearance space between sleeves 29 and the bushing 24 near one edge of the clearance and is forced out near the other edge. The action of the bearing is the same as in the construction shown in Fig. 1, and the circumferential space 31 provides a reservoir for water midway between the ends of the assembly.

A form of the new bearing suitable for lighter duty than the bearings of Figs. 1 and 3 is shown in Fig. 5 and this view also illustrates modifications in the rotary sleeve and stationary bushing, which may be employed in other forms of the new bearing, if desired. In the construction shown in Fig. 5, the shaft 32 carries a metallic sleeve 33 clamped thereon and a rubber sleeve 34 is secured on the metallic sleeve. Sleeve 34 is provided with recesses 35 in the form of longitudinal channels in its outer surface, the channels terminating short of the ends of the sleeve. The sleeve operates within a stationary bushing 36 rigidly mounted within the end of a stern tube 37, and the bushing 36 is longer than sleeve 34 and projects beyond the latter at both ends. A pair of longitudinal channels 38 are formed in the inner surface of the bushing and are of the same shape and location as channels 23, Fig. 4. Channels 38, however, do not extend from end to end of the bushing 36, although the channels are longer than the sleeve 34 and are thus open at their ends. With this arrangement, water can enter each end of the bushing projecting beyond the sleeve 34 and thence enter the portions of the channels exposed beyond the ends of the sleeve 34. The bearing functions in the same manner as those previously described.

In the forms of the new bearing illustrated in Figs. 1 to 5 inclusive, the outer surface of the rotary element is formed with recesses terminating short of the ends thereof, and water trapped in those recesses acts as a lubricant for the portions of the working surfaces, through which load is transmitted from one member of the assembly to the other. While this construction is preferred, I have found that part of the benefits of the invention may be obtained, even though the rotary element has no recesses or channels in which water can be trapped. Such a construction is shown in Figs. 6 and 7.

The bearing shown in Fig. 6 includes a metallic sleeve 39 clamped on shaft 40 and having a rubber sleeve 40 secured thereto. The rubber sleeve rotates within a stationary bushing 42 mounted against rotation in a stern tube 43. The bushing 42 is provided with a pair of internal channels 44 which extend longitudinally from end to end thereof, are open at their ends, and lie offset about 45° on opposite sides of a vertical plane through the assembly. With this construction, water is drawn into the clearance space near one edge thereof and discharged near the other. A film of water adheres to the surface of sleeve 41 and acts as a lubricant for those portions of the working surfaces of the assembly through which the load is transmitted. So long as the rotary member of the assembly is operating at a speed in excess of about 10% of its normal running speed, the film of water between the working surfaces will operate fairly well as a lubricant. As the speed of the rotary member falls below about 10% of its normal running speed, the film of water may break and allow the surfaces to come into direct contact.

In each of the constructions described, it will be noted that the stationary element of the bearing assembly, namely, the bushing, is formed with a plurality of channels open at their ends and lying above a horizontal plane through the assembly with one channel on each side of the vertical plane through the assembly. The construction shown in Fig. 4, which includes two such channels offset 45° on opposite sides of the vertical plane, is preferred and it has been found that additional channels shown are not required for good operation. If the bushing were provided with channels below the horizontal plane through the bearing and, particularly, near the bottom thereof, the effectiveness of the bearing would be greatly reduced. The reason seems to be that, in the case of a bearing having a rotary sleeve provided with recesses, the channels in the bushing below the horizontal plane and within the portions of the bearing through which load is transmitted from one working surface to the other, permit the escape of water trapped within the recesses and a supply of water is no longer available to act as a lubricant, where it is most needed. If the rotary member has no recesses, as in the construction shown in Figs. 6 and 7, the edges of channels in the lower part of the assembly tend to wipe the film of water from the surface of the rotary member and break the film.

In the forms of the new bearing assembly for use under water, one of the working surfaces is preferably made of soft rubber and the other of metal. In the constructions described, the rotary member has the rubber working surface and this arrangement is preferred, although the opposite arrangement, with the stationary bushing lined with rubber and the rotary member having a metallic working surface, may be used.

The formation of the rotary member with the rubber surface is preferred, because the wear in the assembly is limited to an arc of about 120° in the bottom of the bushing, whereas the entire circumference of the rotary member takes wear. It is, therefore, preferable to use the rubber for the rotary member, because of the greater area of rubber over which the wear is then distributed.

In the foregoing, I have described embodiments of the invention suitable for marine use, with the water in which the vessel is afloat acting as the lubricant. In such applications, the stationary bushing is best made of bronze and the rotary sleeve of rubber, although a stationary bushing of reinforced plastic and a rotary sleeve of bronze is satisfactory for some purposes. In industrial applications, in which the assembly lies within a bath of oil, various combinations of materials may be used for the bearing members as, for example, a stationary bushing of bronze and a steel sleeve on the shaft. While the shaft itself may serve as the rotary member, it is better to mount a sleeve upon it to provide the working surface so that any wear is taken by the sleeve, rather than by the shaft. For the same reason, it is better to mount the rotary sleeve on a metallic sleeve clamped to the shaft than to affix the rubber sleeve directly to the shaft.

The bearings shown in Figs. 1–3, inclusive, are employed with shafts of 3″ diameter and upwards. Such shafts require bearings of a length in excess of a foot and it is desirable to employ two rubber rotors in a bearing of that length and to supply lubricant to the space between the rotors, to insure that the bearing will be properly lubricated throughout its length. For shafts less than 3″ in diameter, the bearings may be less than a foot long and, in that case, a single rubber rotor may be used, as in the construction shown in Figs. 5 and 6, since there is no difficulty in insuring proper lubrication of such a bearing.

I claim:

1. In a bearing, the combination of a stationary outer member and a rotatable inner member, the members having opposed working surfaces of different materials, pressure being applied by one member to the other through arcuate portions only of said surfaces during rotation of the inner member, a plurality of recesses in the working surface of the inner member, said recesses being spaced inwardly from the ends of said surfaces, and a plurality of channels in the working surface of the outer member, said channels lying outside said arcuate portion of said surface and being open at their ends.

2. In a bearing, the combination of a stationary outer member and a rotatable inner member lying within the outer member and supported thereby, the members having opposed working surfaces made of different materials and the weight of the inner member being carried by a lower arcuate portion only of the working surface of the outer member, a plurality of recesses in the working surface of the inner member, said recesses lying spaced inwardly from the ends of said surfaces, and a plurality of channels in the working surface of the outer member, said channels lying outside said arcuate portion of said surface and being open at their ends.

3. In a bearing, the combination of a stationary bushing having an internal working surface of metal, a rotatable inner member having a working surface of rubber, pressure being applied by one member to the other through arcuate portions only of said working surfaces during rotation of the inner member, a plurality of recesses in the working surface of the inner member spaced inwardly from the ends of the surfaces, and a plurality of channels in the working surface of the outer member, said channels lying outside said arcuate portion of said surface and being open at their ends.

4. In a bearing, the combination of a stationary bushing having an internal working surface of metal, an inner member mounted for rotation in the bushing and having an external working surface of rubber, the weight of the inner member being carried by a lower arcuate portion only of the working surface of the outer member, a plurality of recesses in the working surface of the inner member, said recesses extending generally axially of the inner member and terminating short of the ends of the working surfaces, and a plurality of channels in the working surface of the bushing, the channels being open at their ends and lying outside said arcuate portion of the working surface of said bushing.

5. A bearing which comprises a housing, a pair of outer members mounted in fixed axial alignment in the housing with their adjacent ends spaced apart, a shaft extending through the aligned outer members, a pair of sleeves on the shaft, each sleeve lying within one of the outer members, the outer surfaces of the sleeves and the inner surfaces of the outer members having arcuate portions only in contact during rotation of the shaft, a plurality of recesses in the outer surface of each sleeve, the recesses terminating inward from the ends of said sleeve and of its associated outer member, a plurality of channels in the inner surfaces of the outer members, said channels lying outside said arcuate portions of said surfaces and being open at their ends, and means for introducing lubricant through the wall of the housing into the space between the adjacent ends of the outer members and the sleeves within said members.

6. A bearing which comprises an outer member mounted in fixed position, a pair of spaced axially aligned inner members mounted for rotation in the outer member, the outer and inner members having arcuate surfaces only, which lie in contact during rotation of the inner members, a plurality of recesses in the outer surfaces of each inner member, the recesses terminating inward from the ends of said working surfaces, and a plurality of channels in the inner surface of the outer member, the channels lying outside said arcuate portion of said inner surface and being open at their ends.

7. A bearing for use on a vessel, which comprises a stern casting having a main passage therethrough and a pair of passages leading forward from openings through the wall of the main passage and having open front ends, a pair of bushings mounted in fixed position within the main passage in the casting and lying on opposite sides of said openings, a shaft extending through the bushings, a pair of sleeves on the shaft, each lying within a bushing, the bushings and their respective sleeves having working surfaces of which arcuate portions only lie in contact during rotation of the shaft, and a plurality of channels in the inner surface of each bushing, the channels having open ends and lying outside said arcuate portions of the inner surfaces of their bushings.

8. A bearing for use on a vessel, which comprises a stern casting having a main passage therethrough and a pair of passages leading forward from openings through the wall of the main passage and having open front ends, a pair of bushings mounted in fixed position within the main passage in the casting and lying on opposite sides of said openings, a shaft extending through the bushings, a pair of sleeves on the shaft, each lying within a bushing, the bushings and their respective sleeves having working surfaces of which arcuate portions only lie in contact during rotation of the shaft, a plurality of channels in the inner surface of each bushing, the channels having open ends and lying outside said arcuate portions of the inner surfaces of their bushings, and a plurality of recesses in the outer surface of each sleeve and terminating short of the ends of the sleeve.

9. A bearing for use in a substantially horizontal position which comprises a bushing held against rotation, a rotary member within the bushing, the bushing and member having substantially cylindrical working surfaces, the weight of the inner member being supported on a lower arcuate portion only of the working surface of the bushing during operation of the bearing, a plurality of axial channels in the working surface of the bushing, the channels being open to the exterior of the bearing and lying outside the arcuate portions of the bushing taking the weight of the inner member, and a plurality of recesses in the working surface of the inner member, said recesses terminating short of the ends of said surface and of the bushing.

10. A bearing for use in a substantially horizontal position which comprises a bushing held against rotation, a rotary member within the bushing, the bushing and member having substantially cylindrical working surfaces, the weight of the inner member being supported on a lower arcuate portion only of the working surface of the bushing during operation of the bearing, a plurality of axial channels in the working surface of the bushing, the channels being open to the exterior of the bearing and lying outside the arcuate portions of the bushing taking the weight of the inner member, one of the channels lying angularly offset at one side of a vertical plane through the bearing and another of the channels lying angularly offset at the opposite side of said plane, and a plurality of recesses in the working surface of the inner member, said recesses terminating short of the ends of said surface and of the bushing.

11. A bearing for use in a substantially horizontal position which comprises a bushing held against rotation, a rotary member within the bushing, the bushing and member having substantially cylindrical working surfaces of which one is of metal and the other of rubber, the weight of the inner member being supported on a lower arcuate portion only of the working surface of the bushing during operation of the bearing, a pair of channels in the working surface of the bushing, the channels extending axially of the bushing, lying offset about 45° on opposite sides of a vertical plane through the bearing, and being open to the exterior of the bearing, and a plurality of axial channels in the working surface of the rotary member, said channels terminating short of the ends of said working surfaces.

12. A bearing for use in a substantially horizontal position which comprises a pair of bushings held against rotation and mounted in spaced relation in axial alignment, a rotary member carrying a pair of spaced sleeves each lying within one of the bushings, each bushing and its sleeve having cylindrical working surfaces, the weight of the inner member being supported on lower arcuate portions only of the working surfaces of the bushings, a plurality of axial channels in the working surface of each bushing, said channels lying outside said arcuate portions of the working surfaces of the bushing and each channel being open at one end to the exterior of the bearing and at the other end to the space between the adjacent ends of the bushings and sleeves, a housing for the bushings having passages leading to said space, and a plurality of axial channels in the working surface of each sleeve, said channels being distributed around the sleeve and terminating short of the ends of the sleeve and of the ends of its associated bushing.

13. A bearing for use in a substantially horizontal position which comprises a bushing held against rotation and having an internal metallic working surface, a shaft extending through the bushing, a metal sleeve removably mounted on the shaft, a rubber sleeve encircling and affixed to the metal sleeve and having an external working surface cooperating with the working surface of the bushing, the weight of the shaft being supported by a lower arcuate portion of the working surface of the bushing, a plurality of channels in the working surface of the bushing, the channels being open to the exterior of the bearing and lying wholly outside said lower arcuate portion of the working surface of the bushing, and a plurality of recesses in the working surface of the rubber sleeve, said recesses terminating short of the ends of the sleeve and of the bushing and being distributed around the rubber sleeve.

14. A bearing for supporting a shaft, which comprises a metallic sleeve adapted to be mounted on the shaft to encircle the latter, means at the ends of the sleeve for holding it fast on the shaft, a pair of bushings adapted to be mounted in fixed axial alignment with their adjacent ends spaced apart and with the shaft passing through them, the shaft sleeve being longer than the over-all length of the bushings when they are mounted in said axial spaced relation, a pair of inner members of sleeve from fast on the metallic sleeve and having their adjacent ends spaced apart, the inner members lying within respective bushings and each inner member having a plurality of recesses in its outer surface terminating inward from the ends of the inner member and of its associated bushing, and a plurality of channels in the inner surface of each bushing, the channels extending the full length of the bushing and being open at both ends, the channels lying in upper arcuate portions only of the bushings.

ROBERT D. SMEALLIE.

REFERENCES CITED

The following references are of record in the file of this patent:

UNITED STATES PATENTS

| Number | Name | Date |
| --- | --- | --- |
| 2,203,039 | Aker | June 4, 1940 |
| 2,375,269 | Yeomans | May 8, 1945 |
| 2,405,799 | Smeallie | Aug. 13, 1946 |